Jan. 12, 1932.  E. S. McKINLAY  1,841,268
CUTTING CHAIN
Filed May 25, 1929
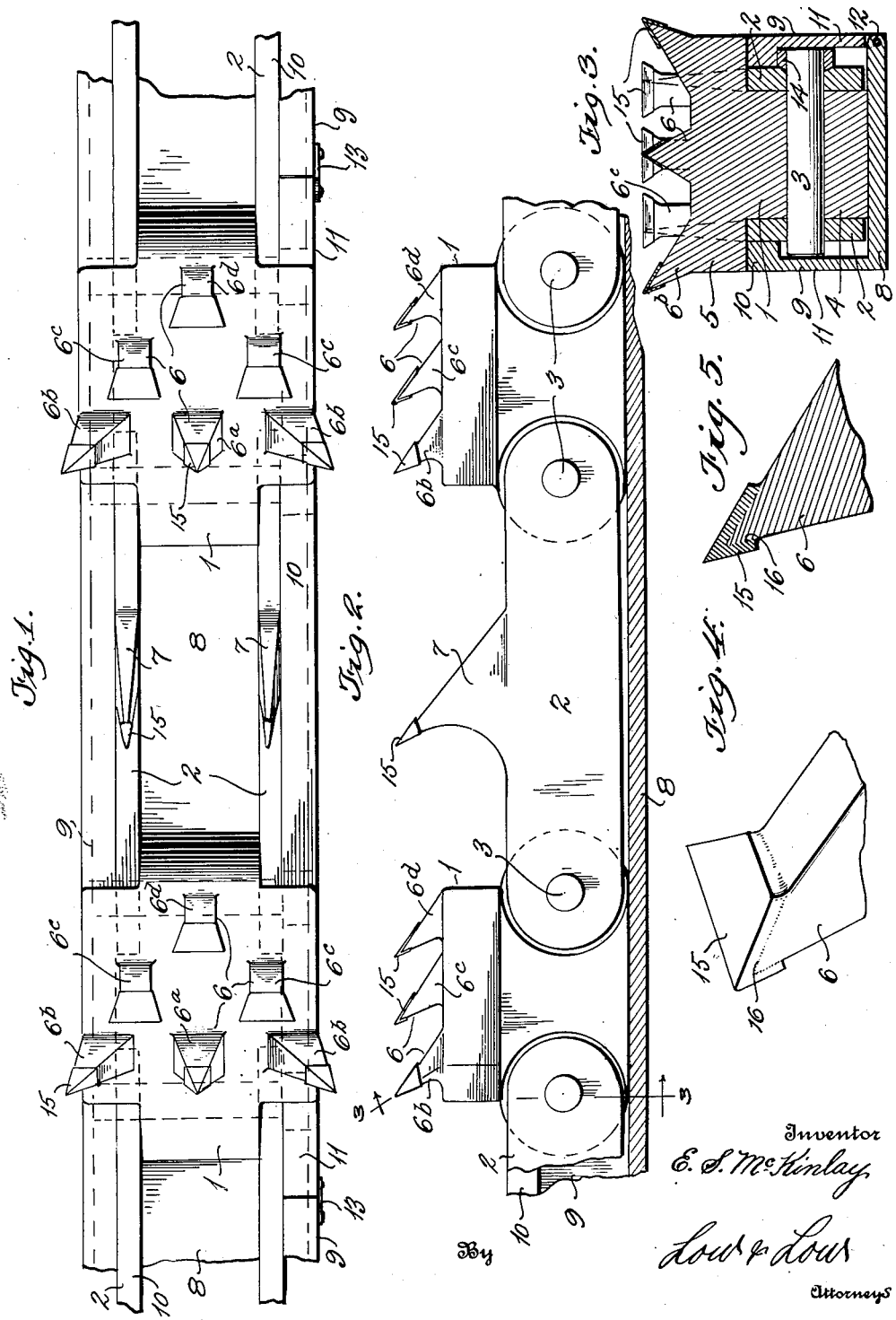

Patented Jan. 12, 1932

1,841,268

UNITED STATES PATENT OFFICE

EDWARD S. McKINLAY, OF DENVER, COLORADO

CUTTING CHAIN

Application filed May 25, 1929. Serial No. 365,924.

The invention relates to cutting or excavating chains for mining purposes, for example coal mining machines, and has for its objects to provide certain new and useful improvements in devices of this character.

It has been common practice to employ cutting chains in which removable cutter bits of high speed steel are employed and designed to be positioned in suitably disposed apertures in the chain blocks, and maintained in position by fastening means such as set screws, bolts or the like. When the cutter bits become worn the same are removed from the blocks and replaced by new bits. The nature of the steel constituting the bits is such as to render the same expensive, and furthermore by this practice only a relatively small part of the bits are employed to actually engage and cut through the material. The remaining portions of the bits constitute the portions engaging with the set screws in the blocks. It has further been the usual practice to employ but a single cutter bit in each block of the chain, and these bits are generally offset in opposite directions in adjacent blocks so as to give the desired pitch or set to the cutter chain. Aside from the expense incident to maintaining cutting or excavating chains each block having a single removable cutter bit of high speed steel, the problem of replacing the cutter bits when worn is a serious one, for the reason that the machine must be stopped and work discontinued for a considerable time to enable the bits to be replaced.

In the present improvements a chain is provided in which the cutter bits are integrally formed as a part of each chain block, thereby eliminating the necessity of providing apertures and bolts or set screws for the maintenance of separate cutting elements or bits.

A further object is to provide a cutter chain in which any desired number of integral teeth may be provided on the chain blocks or connecting links, and in any desired spaced relation. The elements of the chain may be cast or forged by known methods as an incident to their manufacture.

A further object is to provide material economies in that only the actual cutting portions of the chain are formed of a metal or metal alloy of hard wear and heat resisting character. The metal or metal alloy is applied to the cutting portions of the integral lugs of the teeth in the manner of solder by means of an oxy-acetylene flame, blow torch or electric fusing.

The material employed for this purpose is commercially obtainable on the market and is known as stellite, carboloy, hastellite, blackor or widia. These materials vary in their ingredients and cost per pound but each is materially less expensive when applied to the cutting portion only of the teeth in the manner contemplated by the present invention than the usual separate cutter bits of expensive high speed steel.

A further object of the invention is to provide a cutter chain in which the respective elements such as the blocks or links are contained and maintained in alignment within a chain guide, and are individually removable and replaceable relative to the guide with facility and convenience.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:

Fig. 1 is a plan view of a portion of a cutter chain illustrating the invention in a preferred embodiment.

Fig. 2 is a longitudinal section through a portion of the chain guide member and showing the chain in side elevation.

Fig. 3 is a transverse section on line 3—3 of Fig. 2.

Fig. 4 is a detail perspective view of a portion of one of the integrally formed cutting teeth.

Fig. 5 is a vertical section through the portion of the tooth illustrated in Fig. 4.

Referring to the drawings, the cutter chain consists of spaced blocks 1 secured together by intermediate and alternate connecting links 2, said links being pivotally connected at their ends by pins 3 to opposite sides of the block members 1. The latter may consist of heat treated forgings or steel or alloy castings and are illustrated as substantially T-shaped in cross section (Fig. 3). In the embodiment illustrated the block members consist of a base portion 4 and an upper integral portion 5 of greater width so as to extend over and project laterally beyond the link members 2. The portion 5 of each block member is provided with spaced upstanding preferably integral projections or lugs 6 so arranged as to constitute the body portions of the desired number of teeth on the cutting block. As illustrated, six such integral teeth are provided on each block member and are suitably spaced and staggered so as to present a continuous cutting surface to the material being mined or excavated, of a width substantially greater than the width of the block. The three forward integral teeth may be spaced and arranged in transverse alignment as illustrated, and may be of a diamond or pyramidal configuration. The central tooth 6a is inclined forwardly in the usual manner while the outer forward teeth 6b are inclined both forwardly and outwardly so as to effectively mine the material in such manner as to provide clearance for the traveling chain cutter and its guide channel member. The two transversely aligned intermediate teeth 6c and the rearmost single tooth 6d are also preferably inclined forwardly as illustrated and may be of chisel or wedge shape to more effectively engage and break down the material between the kerfs cut by the forward cutting teeth.

The staggered arrangement of the integral lugs 6 constituting the body portions of the cutting teeth insures even cutting by the chain and further renders it more convenient and practical to sharpen the teeth by means of emery wheels. The intermediate side links 2 connecting the blocks 1 also preferably consist of forgings or steel castings and each may be provided with a single integral forwardly and if desired outwardly projected lug 7 constituting the base portion of an additional cutting tooth.

The described integral lugs 6 and 7 on the blocks 1 and links 2 have their cutting portions coated with stellite or other hard metal or alloy of high heat and wear resisting character indicated at 15. The hard metal or alloy when applied is of a fusible nature and will amalgamate as at 16 (Figs. 4 and 5) with the steel constituting the lugs proper. The stellite or other wear resisting metal is applied by known methods, for example, by means of an oxy-acetylene flame or blow torch or by means of an electric torch. The stellite or other alloy is commercially obtainable in the form of sticks which are placed in contact with the lugs when melted by the flame. When the stellite becomes worn off from continuous use it may be reapplied in the form of a coating in the manner described.

Other examples of commerciably obtainable coating for the lugs are alloys or fusible metals of high heat and wear resisting capacity known as blackor, hastellite, carboloy or widia.

The cutter chain is designed to travel within the usual chain guide (except in this case the guides are made continuous) consisting of a base portion 8 and side walls 9, the latter terminating in inwardly projecting flanged portions 10 (Fig. 3). At suitable positions along the guide one of the side walls is preferably cut out and provided with hinged sections or doors 11 pivoted at 12 to the base of the guide. Pivoted latch members 13 (Fig. 1) may be provided to removably secure the hinged sections 11 of the guide to the stationary side walls of the latter. The provision of the hinged sections permits the individual block members 1 or links 2 to be replaced when desired by moving the block or link into registry with one of the hinged sections 11. The section may be swung outwardly on its pivot and the connecting pivot pins 3 may be readily removed by reason of their loose engagement with the block members or links. If desired one or both ends of the pivot pins 3 may be coated as at 14 with stellite or other alloy to provide a bearing engagement with the side walls 9 and upper inturned flange 10 of the chain guide.

The chain has been illustrated as having the block members 1 provided entirely with cutting teeth 6a, 6b, 6c, 6d. The invention contemplates if desired the substitution of wedging members or disks for certain of the rearward teeth. Said wedge members for example are disclosed as a part of the chain in my copending application Serial No. 692,159 filed Feb. 11, 1924 for chain cutters, and are designed and intended to enter the kerfs cut by the forward teeth and wedge and break down the material between and adjacent the kerfs which is a quicker and cheaper method. The wedge members may be coated with the resilient metal or alloy in the same manner as the teeth, if desired.

The overhanging flanges 10 of the chain guide engage the opposite ends of the loosely mounted pivot pins 3, as best seen in Fig. 3, and thereby maintain the chain against outward displacement relative to the guide member.

In cutting chains now generally used the pivot pins are rigidly secured to the links and blocks of the chain, as by riveting and are difficult to remove. Usually it is necessary to cut away the end of the pin in order to effect this withdrawal. Sometimes the pins are squared or of non-circular cross section to assist in maintaining the same in rigid engagement with the links and blocks of the chain. By the present improvements the loose engagement of the pins with the link and block elements insures their ready withdrawal without the use of tools, by merely aligning the links with the cut away portion of the pin-retaining continuous guide and swinging the hinged or movable section outwardly to expose the ends of the pins.

What I claim is:—

1. A cutting chain for excavating purposes, consisting of alternately disposed block and link elements, loosely mounted pivot pins connecting said elements, and a continuous guide member for housing the chain and having a section which is movable to permit substitution and replacement of said elements by the withdrawal and insertion of said loosely mounted pivot pins.

2. A cutting chain for excavating purposes, consisting of a plurality of chain blocks having cutting teeth thereon, and alternately disposed connecting links, pivot pins loosely insertible and removable for connecting said links and blocks, a continuous guide member for housing the chain and having portions engaging the ends of said pins to maintain the latter against displacement, and a movable section on said guide member with which said blocks and links may be moved into registry, said hinged section being adapted to be swung outwardly to afford access to said pins, whereby the latter may be removed to replace one or more of said block or link members.

3. A cutting chain for excavating purposes, consisting of a plurality of chain blocks having cutting teeth thereon, and alternately disposed connecting links, pivot pins loosely insertible and removable for connecting said links and blocks, and a continuous guide member for housing the chain and having portions engaging the ends of said pins to maintain the latter against displacement.

4. In a chain cutter for mining coal and the like, the combination of a plurality of spaced blocks and alternately disposed connecting links, each block having integrally formed thereon one or more projecting teeth, said teeth having on their cutting portions an applied layer of wear resisting alloy, pivot pins loosely connecting said blocks and said links, and projecting laterally beyond the latter, a chain guide member of channel formation for housing the body portion of said chain, and having flanges engaging the laterally projecting portions of said pins to maintain the chain in predetermined position and to hold said blocks against displacement, said guide member having a hinged portion to permit any of said blocks to be removed and replaced by lifting out said loosely mounted pivot pins after a block has been moved into registration with said hinged portion.

5. In a chain cutter for mining coal and the like, the combination of a plurality of spaced blocks and alternately disposed connecting links, each block having integrally formed thereon one or more projecting teeth, said teeth having on their cutting portions an applied layer of wear resisting alloy, and loosely mounted pivot pins connecting said blocks with said links whereby the alloy on any of said teeth may be conveniently renewed.

6. In a chain cutter for mining coal and the like, the combination of a plurality of spaced blocks and alternately disposed connecting links, each block having integrally formed thereon one or more projecting teeth, pivot pins loosely connecting said blocks and said links and projecting laterally beyond the latter, a chain guide member of channel formation for housing the body portion of said chain, and having flanges engaging the laterally projecting portions of said pins to maintain the chain in predetermined position and to hold said blocks against displacement, said guide member having a hinged portion to permit any of said blocks to be removed and replaced by lifting out said loosely mounted pivot pins after a block has been moved into registration with said hinged portion.

In testimony whereof I affix my signature.
EDWARD S. McKINLAY.